US012116954B2

(12) United States Patent
Joret et al.

(10) Patent No.: US 12,116,954 B2
(45) Date of Patent: Oct. 15, 2024

(54) FASTENING OF AN EXHAUST CONE IN A TURBOMACHINE NOZZLE

(71) Applicant: SAFRAN NACELLES, Gonfreville-l'Orcher (FR)

(72) Inventors: Jean-Philippe Joret, Moissy-Cramayel (FR); Vincent Devanlay, Moissy-Cramayel (FR); Fabien Bravin, Moissy-Cramayel (FR); Boualem Merabet, Moissy-Cramayel (FR)

(73) Assignee: SAFRAN NACELLES, Gonfreville-l'Orcher (FR)

( * ) Notice: Subject to any disclaimer, the term of this patent is extended or adjusted under 35 U.S.C. 154(b) by 0 days.

(21) Appl. No.: 18/035,574

(22) PCT Filed: Nov. 3, 2021

(86) PCT No.: PCT/FR2021/051934
§ 371 (c)(1),
(2) Date: May 5, 2023

(87) PCT Pub. No.: WO2022/096820
PCT Pub. Date: May 12, 2022

(65) Prior Publication Data
US 2024/0011453 A1 Jan. 11, 2024

(30) Foreign Application Priority Data

Nov. 5, 2020 (FR) ........................ 2011380

(51) Int. Cl.
*F02K 1/04* (2006.01)
*F02K 1/80* (2006.01)
(52) U.S. Cl.
CPC . *F02K 1/04* (2013.01); *F02K 1/80* (2013.01)
(58) Field of Classification Search
CPC .................................... F02K 1/04; F02K 1/80
See application file for complete search history.

(56) References Cited

U.S. PATENT DOCUMENTS 5,669,812 A * 9/1997 Schockemoehl ....... F02K 1/822
454/45
7,763,191 B2 * 7/2010 Weymouth, Jr. ...... B29C 45/561
264/328.7

(Continued)

FOREIGN PATENT DOCUMENTS

FR         3084916 A1     2/2020
FR         3084917 A1     2/2020
WO    WO-2020030858 A1 *  2/2020  ............. B64D 27/16

OTHER PUBLICATIONS

International Patent Application No. PCT/FR2021/051934 International Search Report dated Jan. 26, 2022, 5 pages.

*Primary Examiner* — Lorne E Meade
(74) *Attorney, Agent, or Firm* — Cozen O'Connor

(57) ABSTRACT

The invention relates to an assembly for a turbine of a turbomachine with a longitudinal axis (X) comprising:
an exhaust cone (100) comprising an outer annular wall (102) for the flow of a primary airflow and an annular box arranged radially inside said outer annular wall (102), the annular box comprising an inner annular wall (104) arranged radially inside the outer annular wall of the exhaust cone,
an exhaust case arranged upstream of the exhaust cone, and
a connecting member (106) flexible in a radial direction, interposed longitudinally between the exhaust case and the exhaust cone (100), the connecting member being fastened to the exhaust case and to the inner annular wall (104), and
wherein the inner annular wall (104) is connected to the outer annular wall (102) by fastening means (112) configured to enable movements of the inner annular (Continued)

wall (104) in a circumferential direction and a longitudinal direction with respect to the outer annular wall (102).

11 Claims, 5 Drawing Sheets

(56) References Cited

U.S. PATENT DOCUMENTS

| | | | | |
|---|---|---|---|---|
| 8,584,363 | B2* | 11/2013 | Caruel | H05B 3/267 |
| | | | | 244/1 N |
| 9,200,537 | B2* | 12/2015 | Bouchard | F01D 25/162 |
| 9,676,469 | B2* | 6/2017 | Benner | F02K 1/04 |
| 10,422,532 | B2* | 9/2019 | Sadil | F23R 3/60 |
| 10,590,806 | B2* | 3/2020 | Konishi | F01D 25/14 |
| 11,519,361 | B2* | 12/2022 | Conete | B64D 33/04 |
| 11,821,387 | B2* | 11/2023 | Conete | F02K 1/04 |
| 11,867,077 | B2* | 1/2024 | Sanz Martinez | G10K 11/172 |
| 2016/0161121 | A1 | 6/2016 | Chang | |

\* cited by examiner

PRIOR ART a b

FASTENING OF AN EXHAUST CONE IN A TURBOMACHINE NOZZLE

CROSS-REFERENCE TO RELATED APPLICATIONS

This application is a US National phase Application of International Patent Application No. PCT/FR2021/051934 filed Nov. 3, 2021, which claims priority to FR No. 2011380 filed Nov. 5, 2020, titled "Fastening of an exhaust cone in a turbomachine nozzle," both of which are hereby incorporated in their entireties.

TECHNICAL FIELD OF THE INVENTION

The invention relates to means for fastening an exhaust cone in a turbomachine nozzle, in particular means for fastening an exhaust cone made of a ceramic matrix composite.

PRIOR ART

The present disclosure relates to an assembly located at the rear (downstream end) of an aircraft turbojet engine to optimise the flow of hot gases expelled by the turbojet engine, and possibly absorb at least part of the noise generated by the interaction of these hot gases, coming from the engine inner portions (combustion chamber, turbine(s)), with the ambient air and with the flow of cold air expelled by the fan of the turbojet engine.

More specifically, the present disclosure relates to the connection between what is often referred to as the exhaust cone and, located just upstream, a gas outlet from the turbojet engine.

Typically, the exhaust cone is completed (surrounded) by a so-called primary nozzle portion.

The exhaust cone is intended to be positioned downstream of the turbine portion of the turbojet engine, around which the primary nozzle is placed concentrically. The exhaust cone and the primary nozzle are both fastened to a casing of the turbojet engine by a system for fastening by flanges.

An assembly for an aircraft turbojet engine represented in FIG. 1 is known, comprising:
- a central gas exhaust element, annular around a longitudinal axis X and adapted so that gas is ejected by the turbojet engine there around, from upstream to downstream, and
- a connection flange interposed between, upstream, a so-called metallic outlet of a turbojet engine and, downstream, the central element, to connect them together.

The aforementioned longitudinal axis X is the longitudinal axis, or axis of rotation, of the turbomachine, in particular of the fan 20 and of the moving blades of the engine 12.

The central gas exhaust element may correspond to the aforementioned exhaust cone (denoted 1 hereinafter), or at least to the upstream portion 1a hereinafter.

A conventional exhaust cone 1 is represented in FIG. 1, on which the upstream (AM) and downstream (AV) of the structure along an engine axis (longitudinal axis X hereinabove) are located respectively to the left and to the right of the figure.

More generally, an aircraft gas turbojet engine 10 is illustrated in FIG. 1, the central portion of which, forming the gas turbine engine 12, is mounted inside an engine nacelle assembly 14, as is typical of an aircraft designed for subsonic operation, such as a turboprop or turbofan engine. In general, the nacelle assembly 14 comprises an engine nacelle 16 and a fan casing 18 surrounding a fan 20 located axially upstream of the engine 12.

The engine 12 comprises, axially in the downstream portion, at least one turbine which may be a low-pressure turbine and, still in the downstream portion, an exhaust case 22 comprising an inner annular shroud 22a and an outer annular shroud 22b delimiting therebetween a downstream portion of the primary annular flow path 24 in which flow the combustion gases originating from the combustion chamber of the engine 12.

The inner annular shroud 22a is connected, at its downstream end, to the exhaust cone 1, which may comprise an upstream portion 1a, with a substantially cylindrical shape, and a downstream portion 1b with a conical shape.

In practice, it remains difficult to connect together the aforementioned metallic outlet of the turbojet engine, which may be said inner annular shroud 22a, and said central element, which may be said upstream portion 1a of the exhaust cone 1. Indeed, at least one portion of the exhaust cone is made of a material different from the exhaust case, which induces thermomechanical stresses, resulting from the thermal gradients between said portion of the exhaust cone and exhaust case. In addition, an acoustic box may be arranged inside the exhaust cone to reduce the noise pollution of the exhaust gases. The connection of the acoustic box to the exhaust case and/or to the exhaust cone is also complex because of the difference in material and therefore in the generated thermomechanical stresses.

SUMMARY OF THE INVENTION

The present disclosure suggests using an assembly of the exhaust cone to the exhaust case which is more reliable and more robust to thermal gradients by the very fact of its connection to either one of the aforementioned parts.

For this purpose, the present disclosure provides an assembly for a turbomachine, more particularly for a nozzle of a turbomachine, with a longitudinal axis comprising:
- an exhaust cone comprising an outer annular wall for the flow of a primary airflow and an annular box, which may be an annular box, arranged radially inside said outer annular wall, the annular box comprising an inner annular wall arranged radially inside the outer annular wall of the exhaust cone,
- an exhaust case arranged upstream of the exhaust cone, and
- a connecting member flexible in a radial direction, interposed longitudinally between the exhaust case and the exhaust cone, the connecting member being fastened to the exhaust case and to the inner annular wall, and
- wherein the inner annular wall is connected to the outer annular wall by fastening means configured to enable movements of the inner annular wall in a circumferential direction and a longitudinal direction with respect to the outer annular wall.

Thus, the fastening means enable circumferential and axial degrees of freedom of the inner annular wall and of the outer annular wall, which allows reducing the thermomechanical stresses subjected to the inner annular wall and the outer annular wall due to the difference in material. In addition, the fastening means allow holding the outer annular wall and the inner annular wall together, and thus reducing the cantilever of the outer annular wall, and therefore its mass.

In the present disclosure, upstream and downstream are defined with respect to the air inlet and outlet of the turbomachine, upstream corresponding to the air inlet and downstream to the air outlet. Moreover, the axial direction corresponds to the direction of the axis of revolution of the turbomachine, which corresponds to the axis of rotation of the rotating parts of the turbomachine, and the radial direction is a direction perpendicular to the axis of revolution.

The fastening means may be mounted with a first clearance in the circumferential direction and a second clearance in the longitudinal direction with the inner annular wall.

The fastening means may be mounted with a first clearance in the circumferential direction and a second clearance in the longitudinal direction with the outer annular wall.

The first clearance may be equal to or different from the second clearance.

At least one of said fastening means may comprise a screw and a nut. The assembly may include an annular clearance between an orifice of the inner annular wall or an orifice of the outer annular wall. Each fastening means may be as mentioned before.

The annular clearance may have a circular or oblong shape.

Said at least one fastening means may comprise a clamping ring and a flexible cup washer radially prestressed between the clamping ring and the inner annular wall.

The cup washer may be dimensioned so as to hold the inner annular wall in position against the outer annular wall while taking into account the geometric tolerances, the thermal expansions and the movements in flight.

The cup washer can deform radially to absorb the radial deformations of the inner annular wall due to the thermomechanical stresses in some flight cases.

The annular clearance may be dimensioned according to the thermal expansion of the surrounding parts such as the clamping ring, the cup washer, etc.

The clamping ring of each fastening means may be mounted with the annular clearance in the orifice of the inner annular wall or the orifice of the outer annular wall. For example, the annular clearance may be provided between the radially outer surface of the clamping ring and the radially inner surface of the orifice of the inner annular wall or of the orifice of the outer annular wall.

Each fastening means may further comprise at least one wear washer. The assembly may comprise a first wear washer arranged radially between the inner annular wall and the outer annular wall and a second wear washer arranged radially between the inner annular wall and the cup washer. Thus, wearing due to the frictions of the inner annular wall and the outer annular wall is reduced.

The connecting member may comprise an annular flange and a plurality of fastening lugs distributed circumferentially around the longitudinal axis, the annular flange being connected to the exhaust case and the fastening lugs being connected to the inner annular wall. At least one of the fastening means may be arranged opposite a circumferential space between two successive fastening lugs.

This arrangement allows limiting the radial bulk of the fastening means.

The fastening lugs of the connecting member may be rigid or flexible. The flexible fastening lugs enable compensating for the thermal expansion between the exhaust cone and the exhaust case.

The inner annular wall may comprise an upstream portion interposed radially between the inner annular wall and the connecting member, said upstream portion of the inner annular wall being connected to the outer annular wall by the fastening means.

Each fastening lug may be connected to the inner annular wall by a connecting means, each of the fastening means and the connecting means form an annular row.

An annular fairing, which may be formed by several angular sectors, may be connected to an upstream portion of the outer annular wall. It may surround the connecting member and form a continuity of a shroud of the exhaust case so as to define an inner annular flow surface of a flow path of a primary airflow. The fairing may be connected to an upstream portion of the annular flange.

A plurality of supports are distributed circumferentially around the longitudinal axis and connected to the inner annular wall, the fairing being fastened against said supports.

An annular seal may be arranged longitudinally between the outer annular wall and the exhaust case and configured to limit the leaks of the primary airflow towards the inside of the inner annular wall.

The annular box may be an acoustic annular box. The acoustic annular box allows limiting the noise pollution due to the flow of gases originating from the turbine. The annular box may comprise a plurality of acoustic partitions extending radially outwards from the inner annular wall of the box. The acoustic partitions may be metallic.

The inner annular wall or the outer annular wall may be made of a composite or metallic material.

The exhaust cone may comprise a downstream portion, for example conical, connected to the outer annular wall made of a ceramic matrix composite.

The exhaust case may be made of a metallic material.

The present disclosure also provides a nozzle comprising an assembly as mentioned before as well as a turbomachine comprising such a nozzle.

BRIEF DESCRIPTION OF THE FIGURES

FIG. 3 FIGS. 3a and 3b represent partial views of the assembly according to the first embodiment.

FIG. 4 FIGS. 4a and 4b represent sectional views of a fastening means equipping the assembly of FIGS. 2 and 3.

FIG. 7 FIGS. 7a and 7b represent partial views of the assembly according to a second embodiment.

DETAILED DESCRIPTION OF THE INVENTION

Figure 1:
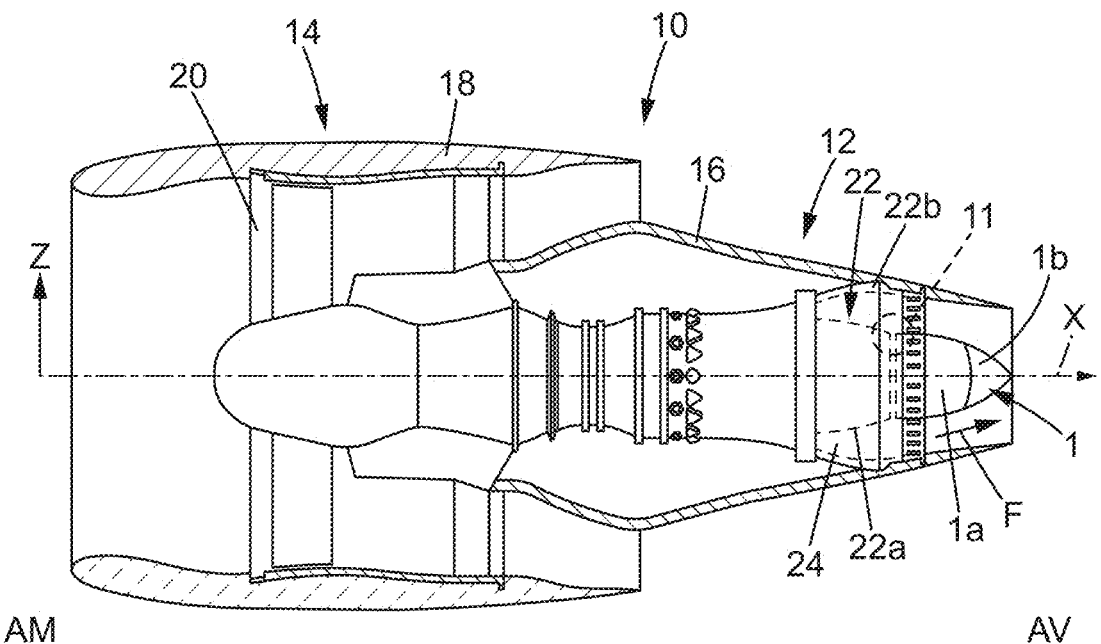
FIG. 1 FIG. 1, already described, represents a schematic profile section of a turbomachine for an aircraft.
Figure 2:
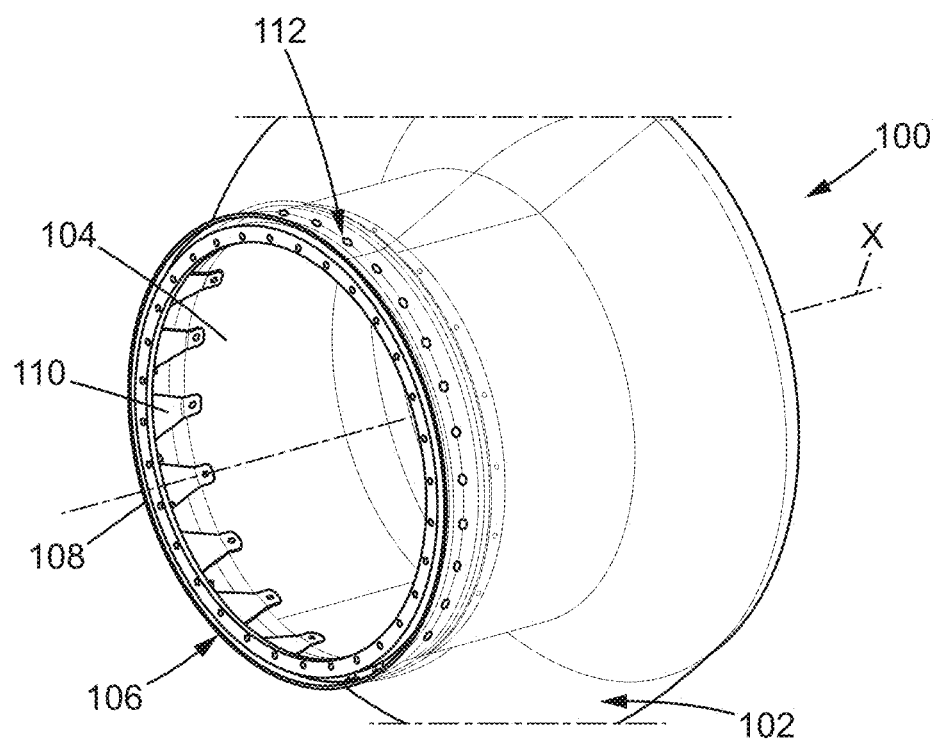
FIG. 2 FIG. 2 represents a perspective view of an upstream portion of an assembly according to a first embodiment.
Figure 3:
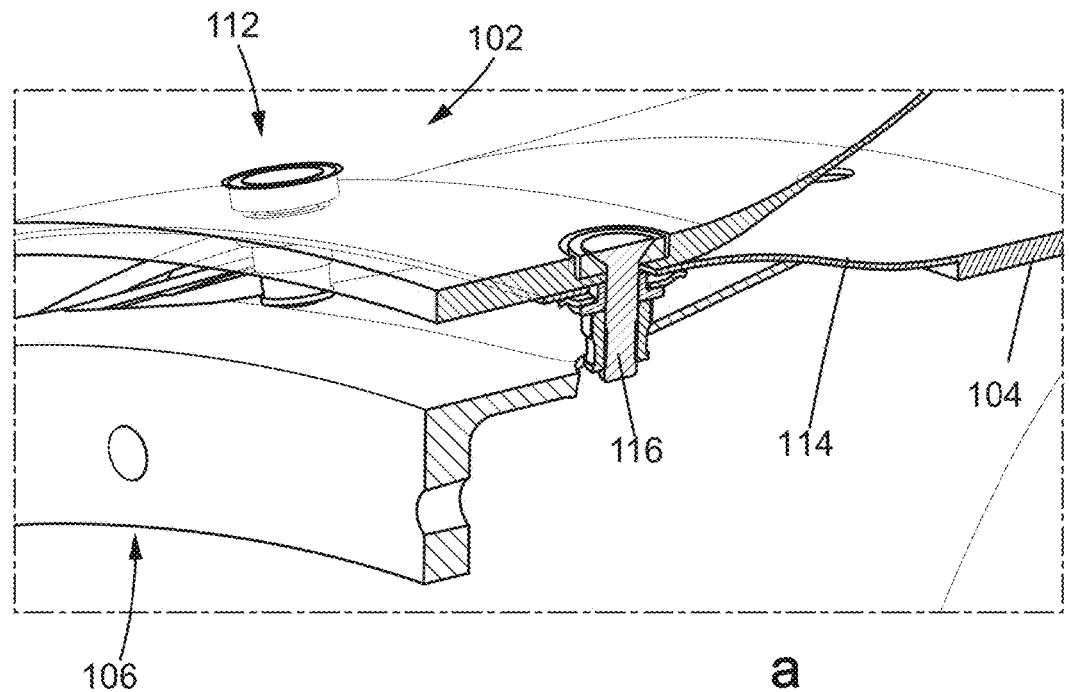
Figure 3:
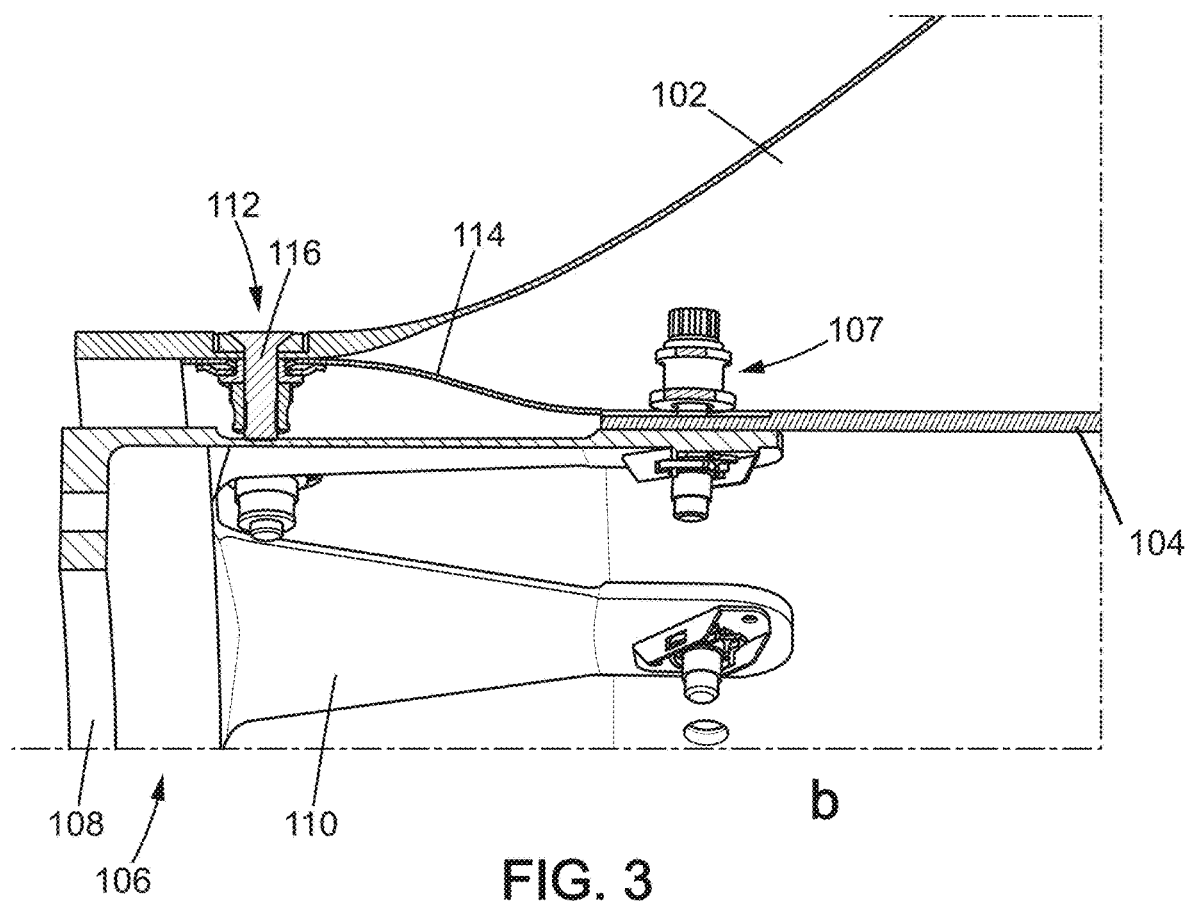
Figure 4A:
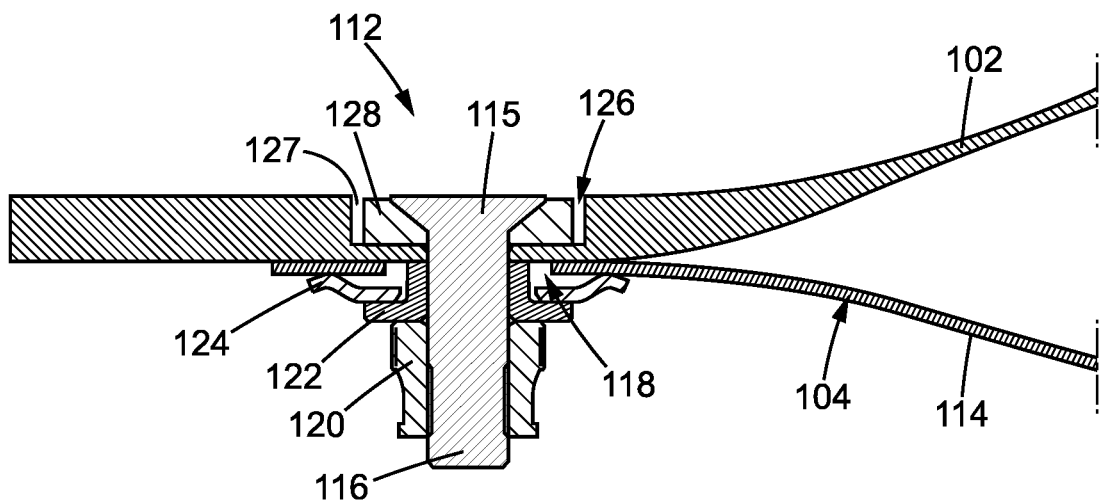

FIGS. 2, 3 and 4 represent a portion of an assembly for a turbomachine according to a first embodiment of the invention. FIGS. 2-4 are detailed views of an area of a turbomachine marked as dashed circle 11 in FIG. 1. This assembly includes an exhaust cone 100 comprising, on the upstream side, an outer annular wall 102 delimiting a flow path for a flow of hot gases and an annular box arranged radially inside the outer annular wall 102. The annular box comprises an inner annular wall 104 arranged radially inside the outer annular wall 102 and a plurality of acoustic partitions arranged between the outer annular wall 102 and the inner annular wall 104. The inner and outer annular walls are annular around a longitudinal axis X. The detailed description is made with reference to an acoustic annular box. Nonetheless, the present disclosure may be applied to other types of annular boxes which are not necessarily acoustic.

The assembly further includes an exhaust case, which is not represented. The inner annular wall 104 of the exhaust cone 100 is connected to said exhaust case, via a connecting member 106. The outer annular wall 102 forms a surface continuity with a portion of the exhaust case, so as to define the flow path of the primary airflow.

The connecting member 106 includes an upstream annular portion 108 and fastening lugs 110 extending axially downstream from the upstream annular portion 108. The fastening lugs 110 are evenly distributed over the circumference and are spaced apart circumferentially from each other. The upstream annular portion 108 is connected to the exhaust case and the fastening lugs 110 are fastened to the inner annular wall 104 of the exhaust cone 100, by bolting the fastening members 107. The fastening lugs 110 may be flexible or rigid. The connecting member 106 may be metallic.

The downstream portion of the outer annular wall 102 is also connected to the downstream portion of the inner annular wall 104.

The upstream portion of the outer annular wall 102 is also connected to the upstream portion 114 of the inner annular wall 104 by fastening means 112. The upstream portion 114 of the inner annular wall 104 is formed by an annular wall extending radially outwards to join the outer annular wall 102. The upstream portion 114 may be an annular wall affixed on the inner annular wall 104 and fastened to the latter by screwing, in particular by screwing directly to the fastening lugs 110. The upstream portion 114 may be formed in one-piece with the inner annular wall 104.

The exhaust cone 100 comprises a conical downstream portion made of a composite material with a ceramic matrix.

The outer annular wall 102 and the inner annular wall 104 may be made of a composite material with a ceramic matrix or of a metallic material.

In operation, the assembly is subjected to high temperatures which induce considerable thermomechanical stresses at the outer and inner annular walls. To reduce the effect of the thermomechanical stresses, the fastening means 112 are mounted with an annular clearance 118 in the upstream portion 114 of the inner annular wall 104.

The fastening means 112 comprise a plurality of screws 116 evenly distributed over the circumference and are spaced apart circumferentially from each other. The screws 116 are mounted with the annular clearance 118 in corresponding orifices of the upstream portion 114 of the inner annular wall 104. The screws 116 extend radially inwards.

The annular clearance 118 enables the circumferential and axial movements of the inner annular wall 104 relative to the outer annular wall 102. Hence, this arrangement enables the thermal expansions of the inner annular wall in the circumferential direction and the axial direction.

The fastening means 112 may be mounted with the annular clearance 118 in a corresponding mounting orifice of the outer annular wall 102.

Each screw 116 may be arranged opposite a fastening lug 110 or the upstream annular portion 108 of the connecting member 106. Thus, each screw may form a radial stop of the outer and inner annular walls, which limits the radial deflections of the annular walls due to thermomechanical stresses.

Each screw 116 may be arranged opposite a circumferential space between two successive fastening lugs 110. This arrangement allows reducing the radial bulk of the assembly.

Each fastening means 112 further comprises a nut 120 and a clamping ring 122 interposed radially between the nut 120 and the outer annular wall 102. The clamping ring 122 is mounted with the annular clearance 118 with respect to the upstream portion 114 of the inner annular wall 104.

Each fastening means 112 further comprises a cup washer 124 formed by an annular portion and a plurality of tabs spaced apart circumferentially around the annular portion of the cup washer 124. The tabs can deform in the radial direction when they are subjected to stresses higher than a tolerance threshold, so as to relieve the structure of the assembly in the event of damages of the assembly in operation, for example in the event of a loss of a vane of the turbine.

The annular clearance 118 may be dimensioned according to the thermal expansion of the surrounding parts such as the nut 120, the clamping ring 122, the screw 116, etc.

Each screw 116 has a conical head 115 arranged in a housing 126 provided in the radially external surface of the outer annular wall 102. Thus, the fastening means 112 do not affect the flow of the primary airflow and therefore the aerodynamic profile of the outer annular wall 102.

Each fastening means 112 further comprises a countersunk ring 128 having a shape complementary to the shape of the conical head 115 and receiving the conical head 115 of the screw 116. The countersunk ring 128 allows limiting the frictions between the screw 116 and the outer annular wall 102. This also allows reducing the risk of break-up of the outer annular wall 102 when tightening the screw 115. Indeed, if the countersink of the screw 115 were to be clamped directly on the outer annular wall 102, it would induce too much force in the outer annular wall 102. The metal ring 128 allows clamping the junction to the pair, and the ring 128 bears on a plane on the outer annular wall 102

Figure 4B:
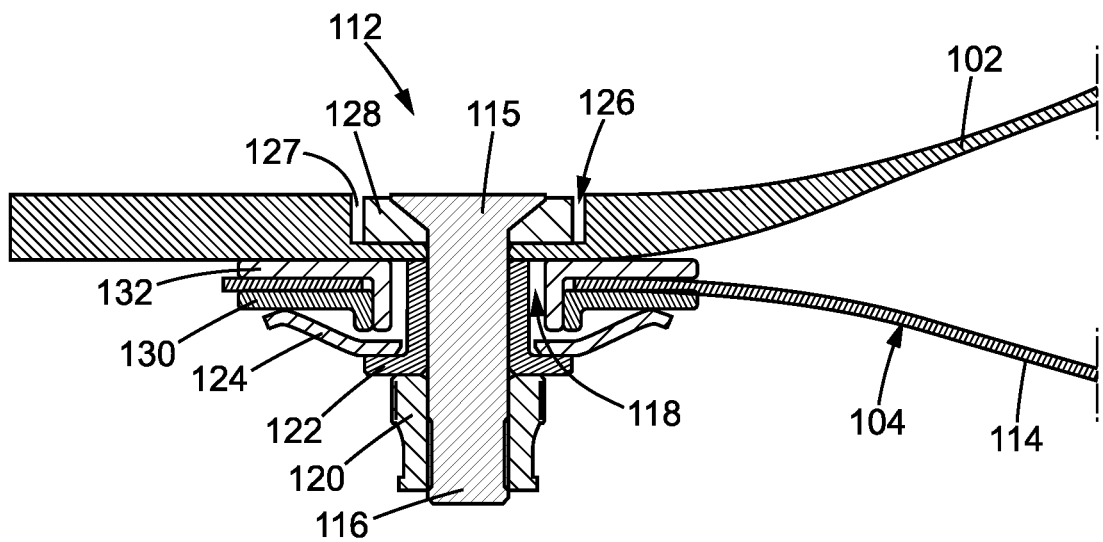

In the variant represented in FIG. 4b, each fastening means 112 comprises a first wear washer 130 arranged between the cup washer 124 and the inner annular wall 104. Each fastening means 112 comprises a second wear washer 132 arranged between the outer annular wall 102 and the inner annular wall 104.

The first wear washer 130 and the second wear washer 132 allow limiting wearing of the parts of the fastening means 112 and of the inner and outer annular walls.

The annular clearance 118 may be circular or oblong.

Figure 5:
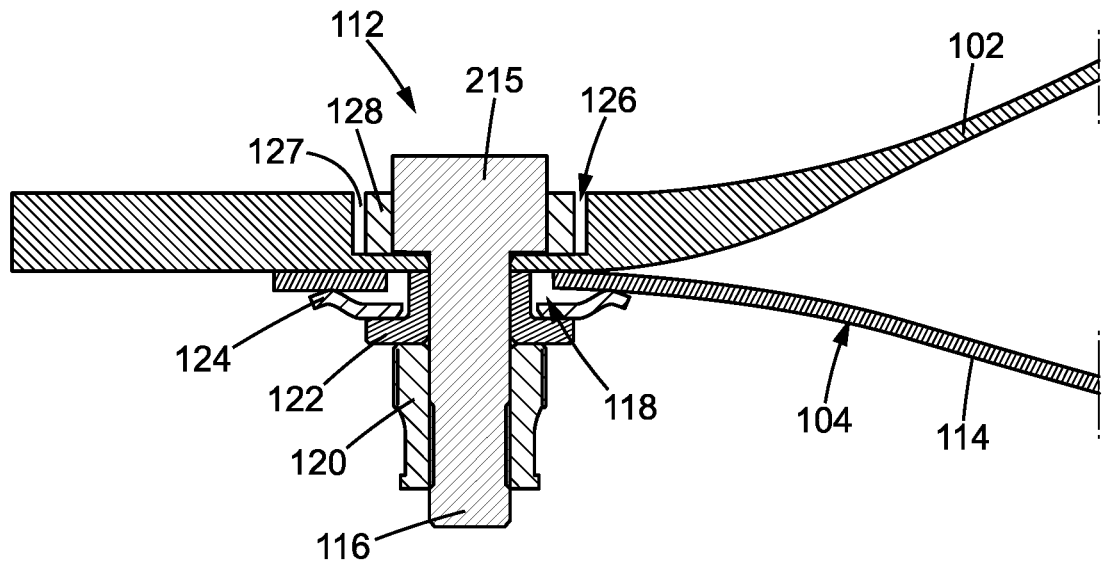
FIG. 5 FIG. 5 represents a sectional view of a fastening means equipping the assembly of FIGS. 2 and 3.

In the variant of FIG. 5, each screw 116 has a protruding head 215 which projects radially outwards from the housing 126. The protruding heads 215 could also be not surrounded by a ring 128. The head 215 could also be formed completely projecting radially outwards from the outer annular wall 102 and there could be no annular clearance 127, the head being applied radially towards the inside of the outer annular wall 102.

Figure 6:
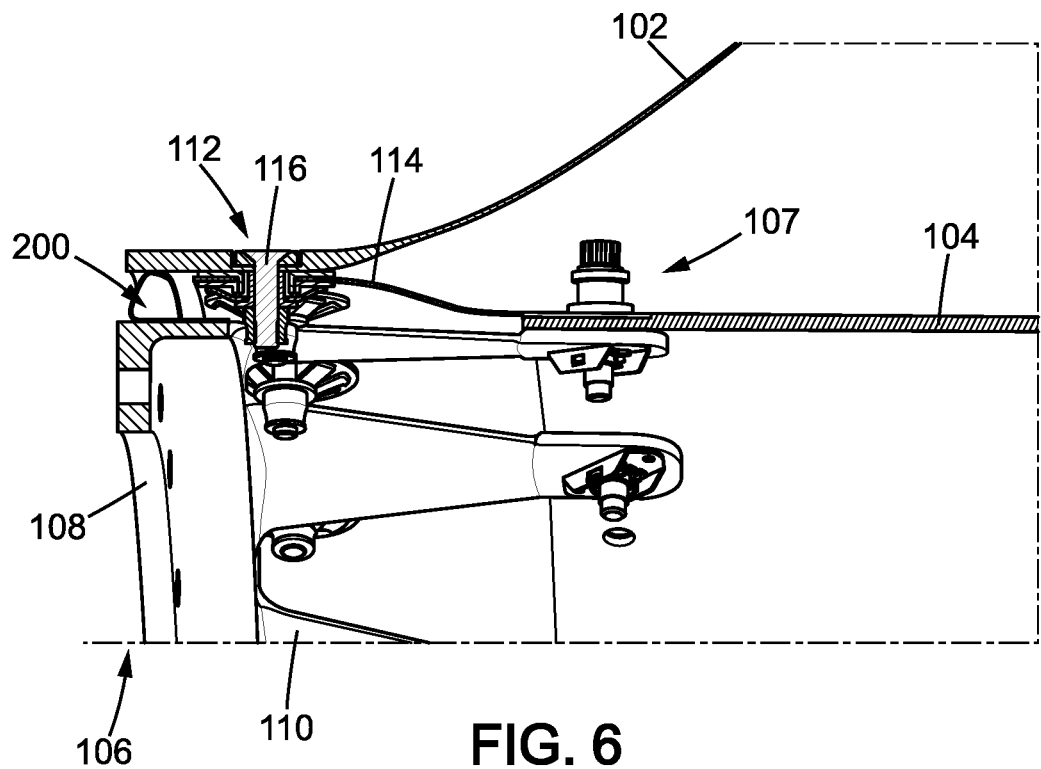
FIG. 6 FIG. 6 represents a partial view of a variant of the assembly of FIGS. 2 and 3.

In the variant of FIG. 6, the assembly comprises an annular seal 200 arranged radially between the connecting member 106 and the outer annular wall 102 so as to seal the radial annular space between the connecting member 106 and the outer annular wall 102. The seal 200 comprises a cylindrical portion arranged around the connecting member 106 and an annular wall extending towards the outer annular wall 102. The seal 200 further comprises an annular rim extending axially and arranged in contact with the inner surface of the outer annular wall 102.

The seal 200 may be formed by a plurality of angular sectors connected together or be formed in one-piece, for example in the form of a slit annular seal.

Figure 7A:
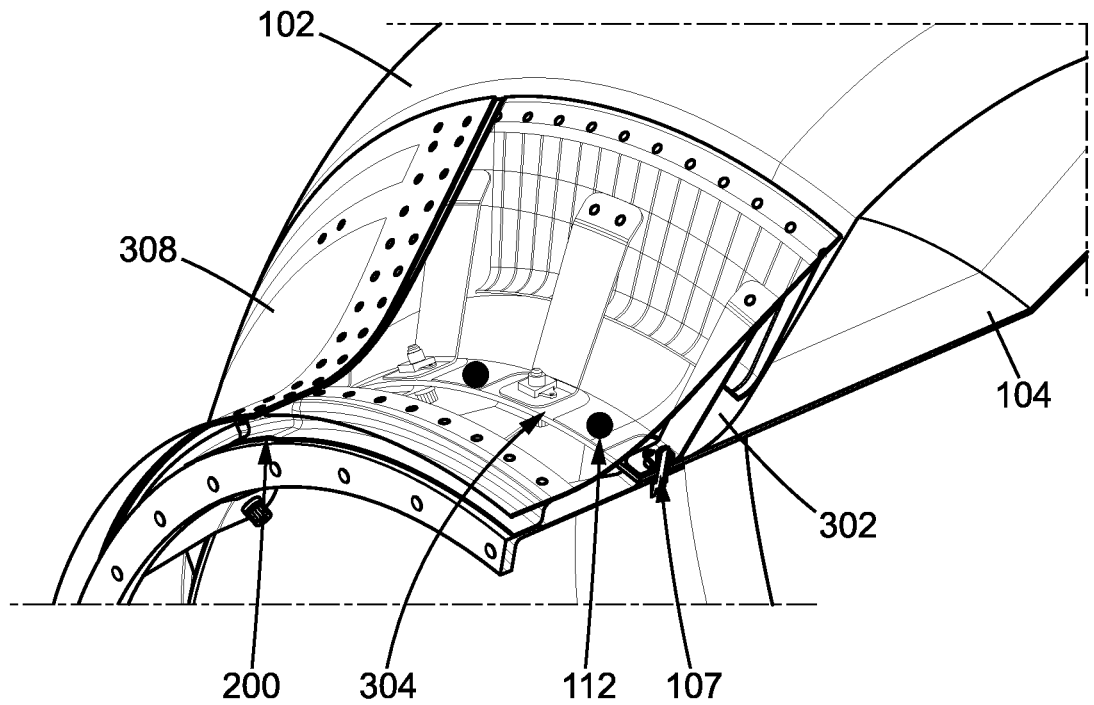
Figure 7B:
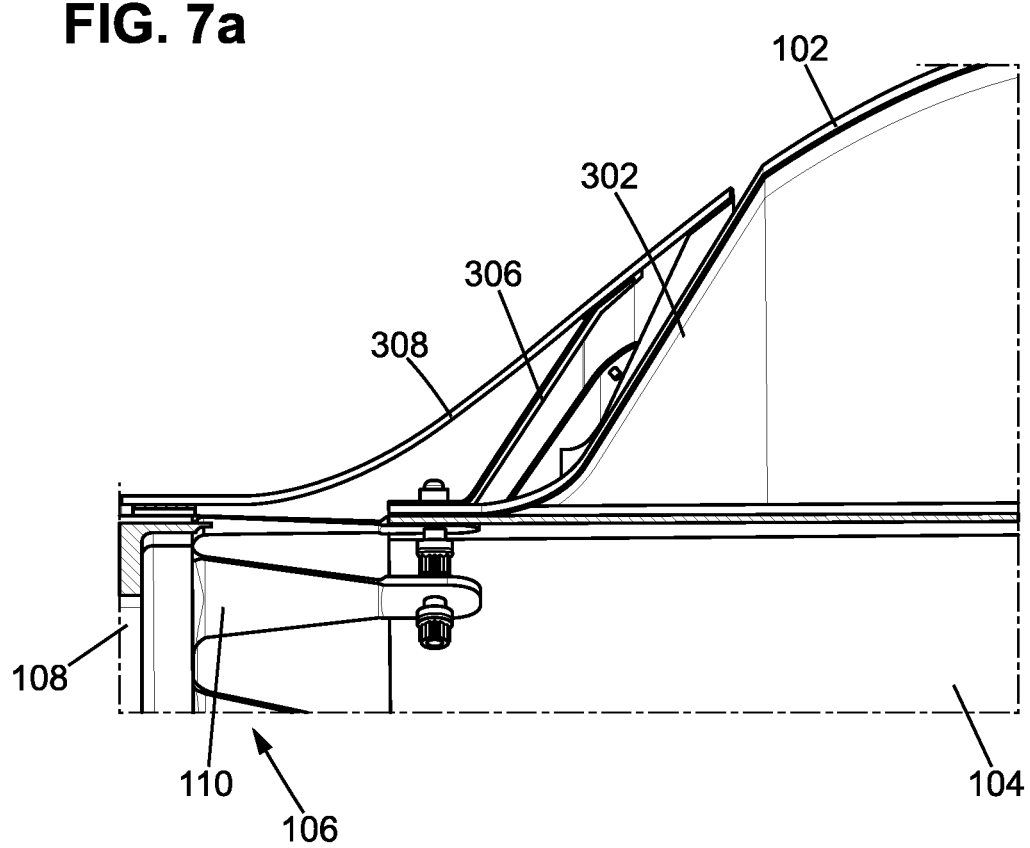

FIG. 7 represents a portion of an assembly for a turbomachine according to a second embodiment of the invention.

This assembly includes the same elements as the assembly of FIG. 6. Unlike the latter, the outer annular wall 102 has an upstream portion 302 extending radially towards the inner annular wall 104. The upstream portion 302 of the outer annular wall 102 is connected to the inner annular wall 102 by the fastening means 112.

The fastening means 112 are mounted with the annular clearance 118 in the corresponding orifice of the outer annular wall 102.

The upstream portion 302 of the annular wall 102 includes a plurality of recesses 304 radially extending and circumferentially spaced apart. The members 107 for fastening the inner annular wall 104 to the connecting member 106 are formed in the recesses 304.

Each of the fastening means 112 and the fastening members 107 are arranged on an annular row around the inner annular wall 104. The annular row of the fastening means 112 and the annular row of the fastening members 107 may be axially offset from each other. They could also be arranged at the same axial position. In either case, the fastening means 112 are alternately disposed circumferentially with the fastening members 107.

The assembly further comprises a plurality of supports 306 distributed circumferentially around the inner annular wall 104. The lugs 306 are fastened to the inner annular wall 104, in particular to the connecting member 106. The supports 306 extend radially outwards from annular wall 104.

The assembly further comprises an annular fairing 308 arranged around the connecting member 106 and forming a continuity of a portion of the exhaust case so as to define the flow path of a primary airflow.

The annular fairing 308 is connected to an upstream portion of the outer annular wall 102. The annular fairing 308 is fastened to the annular flange 108 by means of brackets 200. An annular seal may be interposed radially between the annular fairing 308 and the annular flange 108.

In the different embodiments, there is an annular clearance 127 between the ring and the periphery of the housing 126 of the outer annular wall 102, which enables thermal expansions of the ring 128 and axial movements of the outer annular wall 102. For reasons related to representation, this annular clearance 127 is illustrated only in FIGS. 4 and 5.

The invention claimed is:

1. An assembly for a nozzle of a turbomachine with a longitudinal axis (X) comprising:
    an exhaust cone (100) comprising an outer annular wall (102) for the flow of a primary airflow and an annular box arranged radially inside said outer annular wall (102), the annular box comprising an inner annular wall (104) arranged radially inside the outer annular wall of the exhaust cone,
    an exhaust case arranged upstream of the exhaust cone, and
    a connecting member (106) flexible in a radial direction, interposed longitudinally between the exhaust case and the exhaust cone (100), the connecting member being fastened to the exhaust case and to the inner annular wall (104), and
    wherein the inner annular wall (104) is connected to the outer annular wall (102) by fastening means (112) configured to enable movements of the inner annular wall (104) in a circumferential direction and a longitudinal direction with respect to the outer annular wall (102),
    wherein at least one of said fastening means (112) comprises a screw and a nut, said assembly comprising an annular clearance (118) between an orifice of the inner annular wall (104) or an orifice of the outer annular wall (102), wherein at least one of said fastening means (112) comprises a screw and a nut, said assembly comprising an annular clearance (118) between an orifice of the inner annular wall (104) or an orifice of the outer annular wall (102), and the connecting member (106) comprises an annular flange (108) and a plurality of fastening lugs (110) distributed circumferentially around the longitudinal axis (X), the annular flange (108) being connected to the exhaust case and the fastening lugs being connected to the inner annular wall, and wherein at least one of the fastening means (112) is arranged.

2. The assembly according to claim 1, wherein the fastening means (112) are mounted with a first clearance in the circumferential direction and a second clearance in the longitudinal direction with the inner annular wall or the outer annular wall.

3. The assembly according to claim 1, wherein said at least one fastening means (112) further comprises a clamping ring (122) and a flexible cup washer (124) radially prestressed between the clamping ring (122) and the inner annular wall (104).

4. The assembly according to claim 3, wherein the clamping ring (122) of each fastening means is mounted with the annular clearance (118) in the orifice of the inner annular wall (104) or the orifice of the outer annular wall (102).

5. The assembly according to claim 1, wherein each fastening means (112) further comprises at least one wear washer (130, 132).

6. The assembly according to claim 1, wherein the inner annular wall (104) comprises an upstream portion radially interposed between the inner annular wall (104) and the connecting member (106), said upstream portion (114) of the inner annular wall being connected to the outer annular wall (102) by the fastening means (112).

7. The assembly according to claim 1, wherein each fastening lug (110) is connected to the inner annular wall (104) by a fastening member (107) formed by an assembly of a screw and a nut, each of the fastening means (112) and the fastening member (107) form an annular row.

8. The assembly according to claim 1, comprising a fairing (308) connected to an upstream portion of the outer annular wall (102) and surrounding the connecting member (106) and forming a continuity of a shroud of the exhaust case so as to define an inner annular flow surface of a flow path of a primary airflow.

9. The assembly according to claim 8, further comprising a plurality of supports (306) distributed circumferentially around the longitudinal axis (X) and connected to the inner annular wall (104), the fairing (308) being fastened against said supports (306).

10. The assembly according to claim 1, comprising an annular seal (200) arranged radially between the outer annular wall (102) and the exhaust case and configured to limit leaks of the primary airflow towards the inside of the inner annular wall (104).

11. A turbomachine nozzle comprising an assembly according to claim 1.

* * * * *